(12) United States Patent
Rogers

(10) Patent No.: US 6,530,302 B1
(45) Date of Patent: Mar. 11, 2003

(54) CABINETMAKING SYSTEM

(76) Inventor: William H. Rogers, 5649 Salem Bend Dr., Trotwood, OH (US) 45426

( * ) Notice: Subject to any disclaimer, the term of this patent is extended or adjusted under 35 U.S.C. 154(b) by 233 days.

(21) Appl. No.: 09/695,935

(22) Filed: Oct. 26, 2000

Related U.S. Application Data

(60) Provisional application No. 60/227,653, filed on Aug. 25, 2000.

(51) Int. Cl.[7] .............................. B27G 13/00; B23Q 3/00
(52) U.S. Cl. ................... 83/452; 83/467.1; 144/136.95; 144/137; 144/144.1; 144/253.1; 144/286.5; 144/307; 269/305; 269/236; 269/155
(58) Field of Search ................................ 83/452, 467.1, 83/761, 468.5, 468.6; 144/134.1, 135.2, 136.1, 137, 144.1, 142, 286.1, 136.95, 154.5, 253.1, 307; 269/289 R, 290, 303, 305, 315, 229, 231, 147, 236, 155; 409/182

(56) References Cited

U.S. PATENT DOCUMENTS

| 88,109 | A | * | 3/1869 | Woodville | 144/286.1 |
|---|---|---|---|---|---|
| 822,330 | A | | 6/1906 | Wilson | |
| 2,918,953 | A | * | 12/1959 | Wraight | 144/253.1 |
| 4,022,454 | A | | 5/1977 | Bredvik | |
| 4,176,572 | A | | 12/1979 | Pennington | |
| 4,892,021 | A | | 1/1990 | Sanderson | |
| 5,036,895 | A | * | 8/1991 | Lue | 144/134.1 |
| 5,052,454 | A | * | 10/1991 | Meinhardt | 144/136.95 |
| 5,499,802 | A | | 3/1996 | Haberle | |
| 5,544,559 | A | | 8/1996 | Thiele et al. | |
| 5,573,230 | A | | 11/1996 | Lambertini | |
| 5,732,472 | A | | 3/1998 | Praye | |
| 5,778,951 | A | * | 7/1998 | Huitsing | 144/144.1 |
| 5,816,300 | A | | 10/1998 | Rogers | |
| 5,887,861 | A | | 3/1999 | Kutschker | |
| 6,065,604 | A | * | 5/2000 | Storck | 144/307 |
| 6,076,575 | A | * | 6/2000 | Harkness | 144/144.1 |

FOREIGN PATENT DOCUMENTS

| FR | 2589383 | 5/1987 |
|---|---|---|
| JP | 58-051048 | 3/1983 |

* cited by examiner

Primary Examiner—Allan N. Shoap
Assistant Examiner—Stephen Choi
(74) Attorney, Agent, or Firm—Richard C. Litman

(57) ABSTRACT

A cabinetmaking system having a framing table including opposed fences on each side and a series of adjustably positionable clamps. One of the fences includes a removable central section for maneuvering a cutting tool therethrough. The clamps each include an eccentric cam rotating about a single bolt for securing workpieces along with pressure blocks for edge routing, making glue cuts, forming "biscuit cuts" in the ends and sides for tongue and groove joints, cutting decorative bevels, etc. The system further includes a panel table for clamping cabinet side and rear panels thereto for routing edge and surface grooves for joining the panel together.

16 Claims, 12 Drawing Sheets

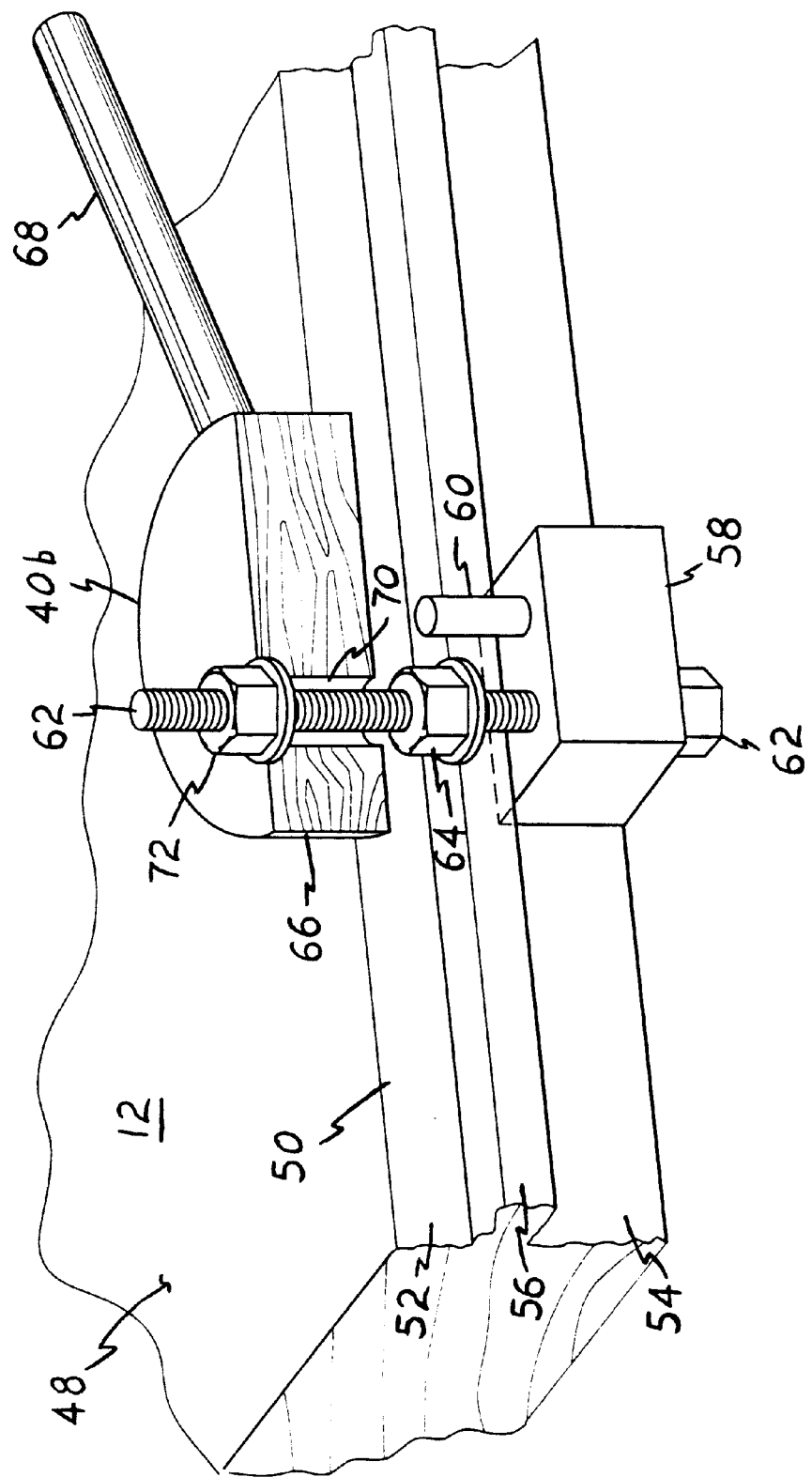

CABINETMAKING SYSTEM

REFERENCE TO RELATED PATENT APPLICATION

This application claims the benefit of U.S. Provisional Patent Application Serial No. 60/227,653, filed on Aug. 25, 2000.

BACKGROUND OF THE INVENTION

1. Field of the Invention

The present invention relates generally to the field of woodworking and cabinetry, and more specifically to a system of fixtures for fabricating various cabinet components therewith. The present system may also be used for forming components for picture and bulletin board framing and construction as well.

2. Description of the Related Art

Various fixtures have been developed in the past, for aligning and temporarily securing materials for cutting and/or other work thereon. Most such devices are relatively generalized, and do not provide for holding specific pieces (e. g., cabinet door, frame, and/or wall components) at specific angles and/or orientations for routing and other cutting operations. While certain fixtures developed in the past may be useful for cabinetmaking, picture framing, and the like, generally speaking, they require excessive adjustment for such workpieces and are not well adapted for use in cutting and forming all of the various components required.

Accordingly, a need will be seen for a system of fixtures for aligning and temporarily clamping various cabinetry and framing workpieces, for cutting, routing, and other work thereon. The present system provides a table which is particularly useful in the finishing of cabinet door and door frame components, and which is also useful in forming smaller frame components used in the construction of framed articles such as picture frames, bulletin boards, etc. Another table of the present system provides for aligning and temporarily securing larger panels for cutting operations and shelf support installation, as used in the construction of cabinet walls and the like.

A discussion of the related art of which the present inventor is aware, and its differences and distinctions from the present invention, is provided below.

U.S. Pat. No. 822,330 issued on Jun. 5, 1906 to Benton Wilson, titled "Saw Table For Curved Work," describes a table including a pair of curved tracks or guides thereon, with a mating carriage which slides along the tracks of the table. The table is secured to a band saw, and the workpiece is secured to the carriage. The carriage is then guided along the curved tracks, with the band saw producing a curved cut in the material. The Wilson table and carriage are relatively limited in comparison to the present invention, as the Wilson device cannot provide for butt and miter cuts and joints, routing of edges and surfaces of material, making "biscuit" cuts for tongue and groove assemblies, etc., all of which are provided by the present invention.

U.S. Pat. No. 4,022,454 issued on May 10, 1977 to Martin Bredvik, titled "Universal Self-Aligning Locator," describes a table having a series of T-slots therein, with a series of adjustably positionable devices installable in the tracks. No fences are provided for securing a workpiece along the side or edge of the table for working with a router or the like, as provided by the present invention. Moreover, while the position of the holding devices may be adjusted as desired in the Bredvik table, no cam action or other force multiplying means is used to provide a more secure grip for an article held therein, whereas the cams used to lock the position of a workpiece on the present fixtures, result in a much more secure installation.

U.S. Pat. No. 4,176,572 issued on Dec. 4, 1979 to Charles A. Pennington, titled "Device For Scoring Wood Panels Prior To Sawing," describes a guide bar which is securable to a panel to be cut, with a set of scoring knives extending from the guide bar. The knives are drawn over the surface of the panel to be cut, thereby making a scoring cut on each side of the kerf to be cut by the saw and reducing or precluding splintering along the cut edges. The Pennington device is not a table, but rather a device which secures to a flat panel for cutting the panel. Accordingly, Pennington cannot provide a series of cam clamps and fences for aligning workpieces for cutting, routing, and other operations, as provided by the present cabinetmaking system invention.

U.S. Pat. No. 4,892,021 issued on Jan. 9, 1990 to Jeffrey A. Sanderson, titled "Variable Angle Saw Guide Apparatus," describes a table or plate having a plurality of alignment holes therein, along which a movable fence may be installed at various angles to the edges of the table. A hold down device is also provided, but the Sanderson hold down passes across the workpiece, rather than clamping the workpiece between opposed plural clamps, as in the present invention. The Sanderson device is not adaptable for use in forming cabinet or framing components, as such components are generally routed along at least one edge thereof for decorative or other purposes. As the Sanderson clamp extends across the workpiece, it precludes the passage of a routing tool along one edge of the workpiece.

U.S. Pat. No. 5,499,802 issued on Mar. 19, 1996 to Rainer Haberle, titled "Workpiece-Holding System," describes a work table having a series of T slots formed therein, with a number of axially mounted clamps which are adjustably installable along the T slots. Each of the clamps is in the form of an irregular polygon, with one of the faces bearing against the workpiece. The relatively limited number of bearing faces provided by the polygons, limits the clamping pressure which may be applied. The present invention uses eccentric circular shapes for the locking clamps, which allows pressure to be adjusted to any practicable degree desired. More importantly, Haberle does not disclose any form of fence or guide for positioning a workpiece for edge routing, forming biscuit cuts, making butt or miter end cuts, as provided by the present invention.

U.S. Pat. No. 5,544,559 issued on Aug. 13, 1996 to Siegfried Thiele et al., titled "Workpiece Abutment For Machine Tools," describes a fixture having a two position adjustable fence, for positioning a workpiece on a circular saw table or the like. The Thiele et al. device is not a table or work surface, as in the two embodiments of the present invention. Rather, the Thiele et al. device must be secured to the work table in order to serve as a workpiece guide or positioner. Thiele et al. do not disclose any means of positioning a workpiece for edge routing, making biscuit cuts, or miter cuts in larger or smaller stock, which features are a part of the present cabinetmaking system.

U.S. Pat. No. 5,573,230 issued on Nov. 12, 1996 to Giuseppe Lambertini, titled "Device For Blocking A Piece On A Support Plane Like A Table For Operating Machines," describes an eccentric type clamp wherein the central eccentric is turned by a specially adapted wrench. One or more of the Lambertini clamps may be adjustably installed on a work table by means of T slots formed in the surface of the table. The Lambertini clamps differ from those used with the present invention in that the present clamps comprise eccentric circular cams which are tightened by handles extending radially therefrom. More importantly, Lambertini does not provide any lateral fences for positioning a workpiece therealong for routing and other operations, as provided by the present cabinetmaking system.

U.S. Pat. No. 5,732,472 issued on Mar. 31, 1998 to Brian Praye, titled "Gypsum Wallboard Scoring Tool," describes a modified T-square having a guide channel installed thereon. A cutter assembly secures within the track, but when pressure is applied to the cutter, it is locked immovably in place in the channel. The T-square head is then moved along the edge of the panel, with the blade of the cutter assembly scoring the panel parallel to the reference edge. Praye does not provide a work table, but rather uses the wallboard sheet as a table or guide for his scoring tool. Accordingly, no means of adjustably securing a workpiece to a table, nor for holding such a workpiece for routing or other edge work, is disclosed by Pray.

U.S. Pat. No. 5,816,300 issued on Oct. 6, 1998 to the present inventor, titled "Woodworking Jig," describes a single table or fixture adapted for making cuts in the 45 degree mitered ends of cabinet door and door frame components. The device of the '300 U.S. Patent cannot be used for forming biscuit or other cuts in the ends of square cut material, whereas such function is provided by the present system, which also includes at least one guide for components having other than square cut ends. Moreover, the present system also includes a table for holding larger panels, as for routing edge and surface grooves in cabinet panels for interlocking assembly thereof. Also, it is noted that the cam clamps of the '300 U.S. Patent differ from those of the present invention, with locking for locating the clamp and locking the clamping action of the clamp, being two independent operations.

U.S. Pat. No. 5,887,861 issued on Mar. 30, 1999 to Wolfgang Kutschker, titled "Workpiece Stop Device," describes a complex motorized device for use with a sheet metal forming machine, such as a large bending brake or the like. As such operations do not involve routing and other finishing of edges and surfaces of relatively thick workpieces, Kutschker does not provide lateral fences or other means for securing work for edge or end finishing work, as provided by the present cabinetmaking system.

Japanese Patent Publication No. 58-51,048 published on Mar. 25, 1983 describes (according to the English abstract) leveling plugs set into a base plate. Each of the plugs has a set screw in its center, which is threaded in or out of the plug to raise or lower the plug as desired. The devices are not adjustably positionable to different locations on the table, nor do they provide any form of lateral clamping action, as provided by the cam clamps of the present cabinetmaking system.

Finally, French Patent Publication No. 2,589,383 published on May 7, 1987 describes (according to the English abstract) a point marker for marking reference points in a metal workpiece, e. g., a steel angle. Routing of an edge of the workpiece is not possible using the device of the French Patent Publication, as the measuring tool would impede movement of the router. Moreover, no clamping means or guide means for other cutting operations is disclosed in the French Patent Publication.

None of the above inventions and patents, either singly or in combination, is seen to describe the instant invention as claimed.

SUMMARY OF THE INVENTION

The present invention comprises a system for cabinetmaking and finishing framing members for picture frames, bulletin boards, and similar structures. The present cabinetmaking system essentially comprises two fixtures, with the first including a pair of opposed fences adjacent each edge for clamping elongate workpieces (door and door frame stiles and rails for cabinetmaking, etc.) therein for routing decorative edges, dado cuts for mating with other components, etc. The first fixture also includes a removable fence section for further versatility and interchangeable guides for forming "biscuit" cuts (i. e., end slots in mating components for inserting the separate tongue or "biscuit" of a tongue and groove assembly) in the ends of the workpieces, and for holding smaller framing components for work thereon.

The second fixture is adapted for holding larger panels thereon, for routing edge and surface grooves therein for assembly to other panels. Intermediate surface grooves may be formed, for the installation of metal channels therein which provide adjustable support for shelving in the completed cabinets. Both fixtures include a plurality of cam clamp devices, which are adjustably positionable on the fixtures and which serve to lock or clamp the workpieces in place on their respective fixtures. The cam clamps are independently positionable and lockable, using a single slider block and threaded bolt extending therefrom.

Accordingly, it is a principal object of the invention to provide an improved cabinetmaking system including means for positioning and securing workpieces therein for edge and surface routing, making biscuit and other joinery cuts, and for use in forming picture and other framing sections.

It is another object of the invention to provide an improved cabinetmaking system having a first table for use in working relatively narrow and elongate components such as cabinet door frames and picture frame sections, and a second table for use in working relatively wide and flat components such as cabinet panels.

It is a further object of the invention to provide an improved cabinetmaking system in which a first table includes means for temporarily securing workpieces with one edge extending from the table for routing work, and other means for positioning workpieces for biscuit and other cuts.

An additional object of the invention is to provide an improved cabinetmaking system in which a second table includes means for temporarily securing relatively wide workpieces thereon for edge and surface routing thereon.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 8A is a detailed perspective view in section of an exemplary clamping member used in the present cabinetmaking system, showing its structure and function.

Similar reference characters denote corresponding features consistently throughout the attached drawings.

DETAILED DESCRIPTION OF THE PREFERRED EMBODIMENTS

Figure 1:
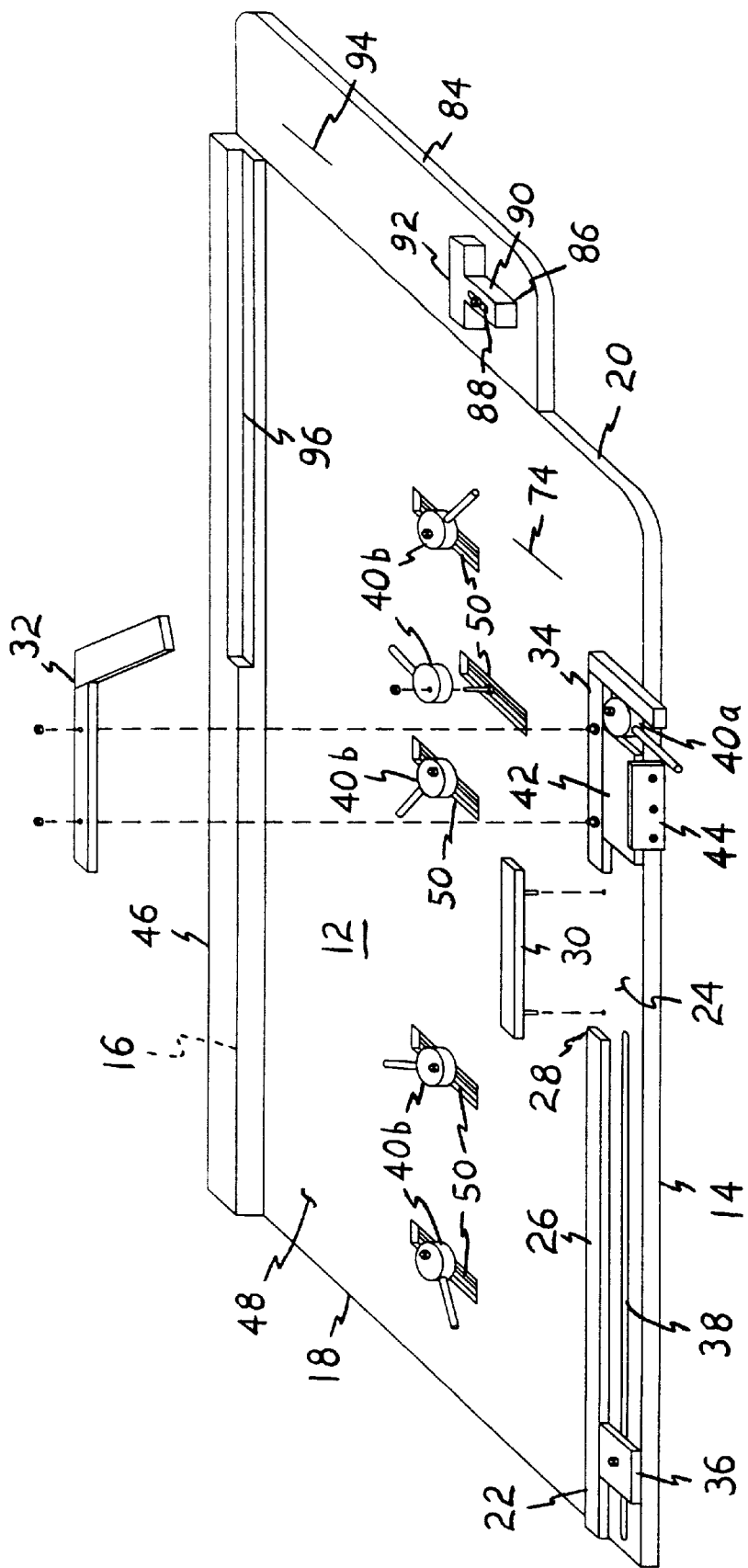
FIG. 1 is a perspective view of the framing table of the present cabinetmaking system, showing its various components.

The present invention comprises a cabinetmaking system, for cutting and forming panels used for doors and door frames, side, wall, and bottom panels, etc., as used in the cabinetmaking trade. The present system is also sufficiently versatile for use in cutting and routing smaller frame members, as used in picture framing and construction of bulletin boards and the like, as well.

The present system essentially comprises two basic components. The first is a framing table for use in forming relatively long and thin cabinet and framing components, illustrated in FIGS. 1 through 7 and designated by the reference numeral 10 throughout those drawing Figures. The second component is a paneling table for use in forming relatively wide and flat panels, illustrated in FIGS. 9 through 11 and designated by the reference numeral 100 throughout those drawing Figures.

The framing table 10 of FIGS. 1 through 7 essentially comprises a relatively long and flat table or board 12, with the board 12 including a series of clamps, blocks, etc. disposed thereon for temporarily securing various framing components thereon for cutting and shaping as required. The table 10 includes parallel opposed first and second edges 14 and 16 (the second edge 16 being concealed by a fence disposed therealong, in FIGS. 1 through 7) and parallel opposed first and second ends 18 and 20, with the edges and ends 14 through 20 defining a generally rectangular shape.

The table 10 includes a first fence 22 installed parallel to and set back or inwardly somewhat from the first edge 14 thereof. The table area between the first fence 22 and the first edge 14 comprises a first workpiece support surface 24 for supporting and temporarily clamping workpieces thereto, e. g., for routing along the exposed edge thereof, etc. The first fence 22 includes a permanently and immovably installed first end portion 26, which extends from the first end 18 to a generally medial point 28 adjacent the first edge 14 of the table 12. A second removably installable medial portion 30 is extendible from the medial end point 28 of the first fence 22, with the second end portion of the fence 22 being formed by one of a series of interchangeably installable second end sections, e. g., forty five degree guide section 32 and ninety degree guide section 34. Other interchangeable guide sections having different angles, e. g., thirty degrees, sixty degrees, etc., may be provided as desired.

A clamping block 36 is secured to the workpiece support surface 24 of the table 12, and is adjustably positionable a long an adjustment track 38 formed along the surface 24 of the table 12 and parallel to the first edge 14 and first fence 22 thereof; details of the adjustment track 38 are described further below, and illustrated in FIGS. 8A and 8B of the drawings. The clamping block 36 may be locked in place to define a fixed end for securing a workpiece upon the workpiece support surface 24 of the table 12.

A clamping cam 40a is provided at one end of the workpiece support area 24, adjacent the location of the removable second end sections 32, 34, etc. of the first fence 22. The cam 40a cannot be repositioned linearly along a track in the table 12, as can other selectively positionable cams 40b discussed further below, but otherwise the two cams 40a and 40b are identical, with their structure and operation discussed more specifically further below. The cam 40a serves as an adjustable clamp to provide leverage for tightly securing a workpiece along the first workpiece support surface 24, as described further below. A slider block 42 is placed between the clamping cam 40a and the workpiece, with the block 42 having a workpiece contact end for bearing against one end of the workpiece to provide a broader area of pressure against the workpiece to avoid marring of the workpiece by a localized pressure point thereagainst. Lateral movement of the block 42 from the workpiece support surface 24 is precluded by the second end component 32, 34 of the fence 22 and a smaller slider block guide fence 44 extending upwardly from the first edge 14 of the table 12.

Figure 2:
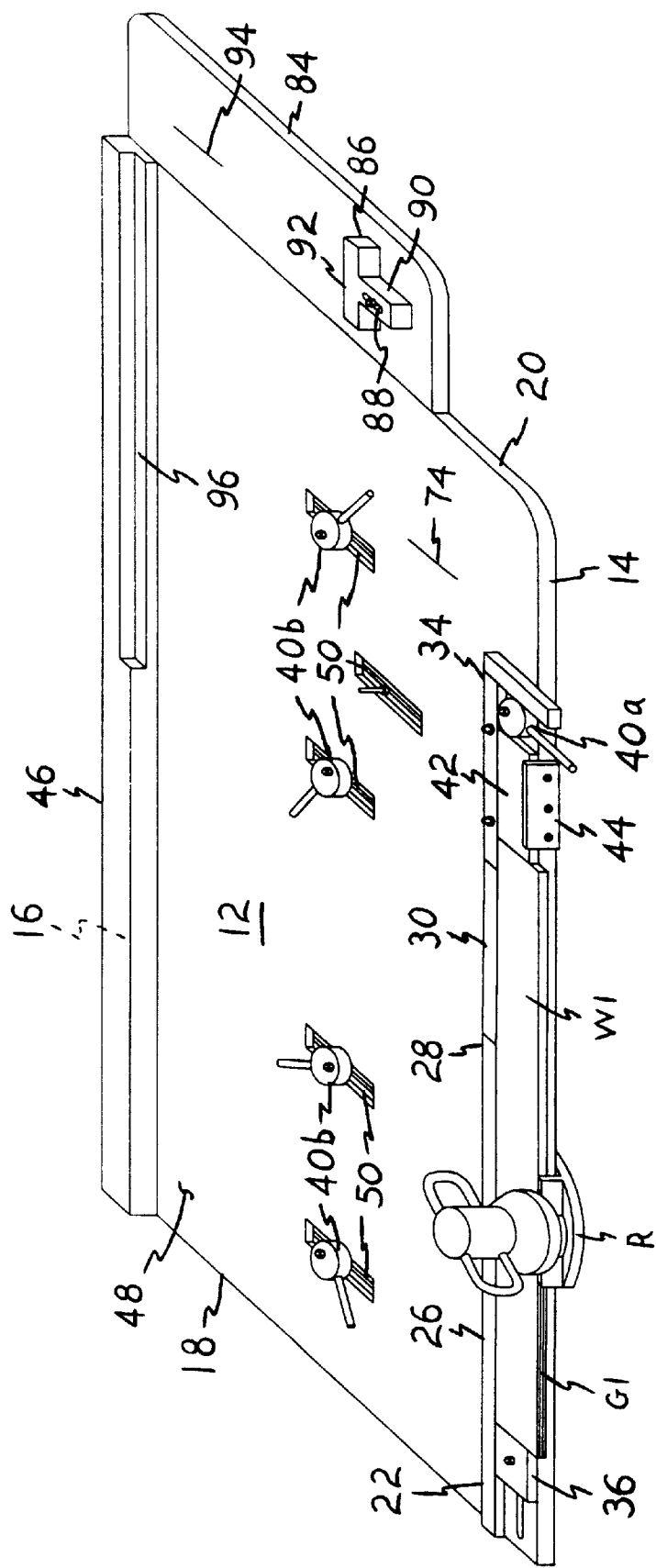
FIG. 2 is a perspective view of the table of FIG. 1, showing the clamping of a cabinet frame member along one edge thereof for routing an edge of the frame member.

FIG. 2 illustrates the function and operation of the first workpiece support area 24 and associated means for removably securing a first workpiece W1 (e. g., cabinet door stile or rail edge component, etc.) thereto. The removable section 30 of the first fence 22 is installed by inserting its pins into the corresponding holes in the table 12, and one of the interchangeable guides 32, 34, etc. is secured to the table 12 by threaded bolts extending upwardly through the table 12 and corresponding nuts. The cam 40a is loosened and the slider block 42 is placed in position adjacent thereto, facing the clamping block 36 near the first end of the fence 22. The workpiece W1 is then placed on the surface 24 (concealed in FIG. 2 by the first workpiece W1), and the clamping block 36 is locked into position adjacent the corresponding end of the elongate first workpiece W1. The locking means is essentially the same as that shown in FIGS. 8A and 8B for the cams 40a and 40b, and is described in detail further below.

At this point, the cam 40a is turned to apply pressure to the slider block 42 and locked in place, thus capturing the first workpiece W1 securely and immovably between the slider block 42 and the opposite clamping block 36. The working edge of the workpiece W1 extends past the first side 14 of the table 12, thus providing working room for a router R to be run along the working edge of the workpiece W1 for routing a panel groove G1 or the like therealong, generally as shown in FIG. 2 of the drawings. Release of the workpiece W1 after the work has been accomplished, is essentially the reverse of the steps described above for securing the workpiece.

The present framing table 10 includes a second fence 46 disposed along the second side 16 thereof, with the second fence 46 being parallel to the first fence 22 and defining a second workpiece support surface 48 therebetween. A series of positionally adjustable clamping cams 40b is provided on the second workpiece support surface 48; these clamping cams 40b are not only pivotable to provide the desired cam action, but may also be positioned laterally along corresponding elongate clamp adjustment tracks 50 formed in the second workpiece support surface 48.

Figure 8B:
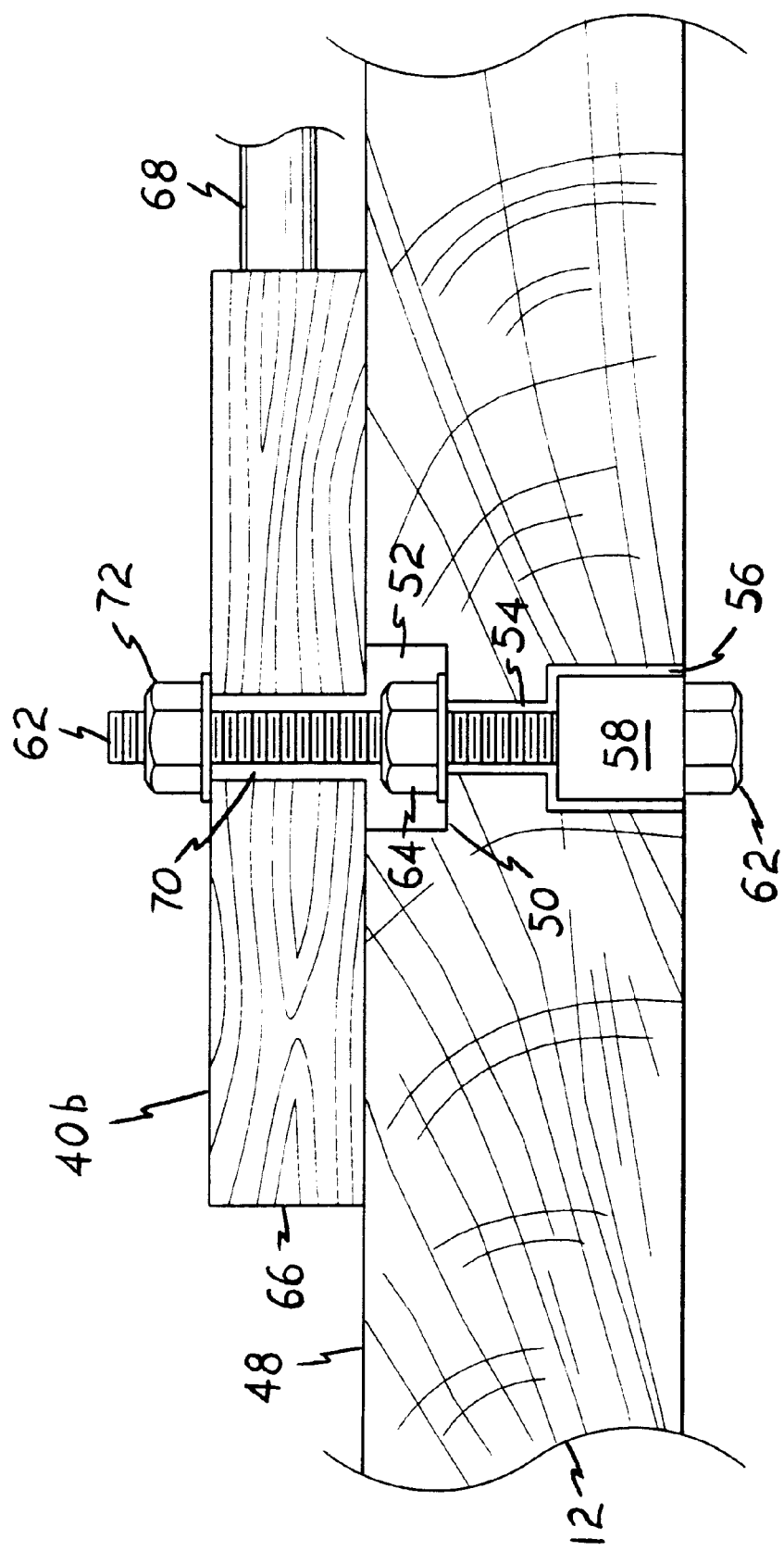
FIG. 8B is an end elevation view in section of the clamping member of FIG. 8A, showing further details thereof.

FIGS. 8A and 8B illustrate the structure of these adjustably positionable clamping cams 40b and their lateral tracks 50. Each track 50 includes a recessed top channel 52 and a bottom channel 54 recessed into the bottom of the table 12, extending for the length of the corresponding track 50. A relatively narrower slot 56 extends between the two channels 52 and 54, with the two channels 52 and 54 communicating with one another by means of the slot 56.

A locking bolt retaining block 58 is placed in the bottom channel 54, with the retaining block 58 having an alignment pin 60 and locking bolt 62 extending upwardly therefrom to engage the slot 56. The pin 60 is relatively short and does not extend above the top of the slot 56, and serves primarily to slide within the slot 56 to guide the retaining block 58 as it slides within the lower channel 54. The locking bolt 62 extends upwardly above the second workpiece support surface 48 of the table 12, with a retaining block locking nut 64 installed generally medially along the locking bolt 62 to lock the retaining block 58 along the track 50 as desired.

The track 38 used to secure the clamping block 36 adjustably along the first workpiece support surface 24 has a configuration similar to that of the tracks 50. However, no recessed top channel is provided, as it is not necessary to recess the track 38 for clearance for the position locking nut. This nut is located atop the clamping block 36, rather than therebeneath, as is the case with the clamping cams 40b. Accordingly, the track 38 is provided with only a recessed bottom channel and a slot extending upwardly therefrom to the first workpiece support area 24 of the table 12.

The recessed upper channel 52 of each of the tracks 50 provides clearance for the retaining block locking nut 64 of the retaining block 58, as each of the clamping cams 40b fits flush with the second workpiece support surface 48 of the table 12. Each of these cams 40b comprises a generally circular disc, with the circumferential surface of the disc having a contact face 66 thereon. A handle 68 providing leverage for rotating the cam disc 40b extends generally radially from the disc, and generally opposite the contact face 66 of the disc. Each disc 40b includes an axially offset pivot hole 70 formed therethrough, and positioned relatively closer to the contact face 66 of the disc. The disc 40a is secured to a corresponding locking bolt 62 by passing the hole 70 over the bolt 62, and securing the disc with a cam locking nut 72. The cam 40b (or 40a)is adjusted by turning the leverage handle 68 to cause the contact face 66 of the disc to apply bearing pressure against the workpiece, whereupon the cam locking nut 72 is tightened to secure the assembly.

The various stiles (uprights) and rails (crossmembers) used in constructing a cabinet door frame or door surround, must be secured together. A sturdy, yet attractive, means of securing such frame members together is by means of a dado or tongue and groove assembly, accomplished by forming a "biscuit cut" slot in each of the two mating members and gluing a "biscuit," or round disc, into the two slots to join the members together. A specialized tool, known as a "biscuit cutter," is used to form the slots in the frame members. The second workpiece support surface 48 and the adjustably positionable clamping cams 40b provide means for securing a workpiece on the present framing table 10 for such work.

Figure 3:
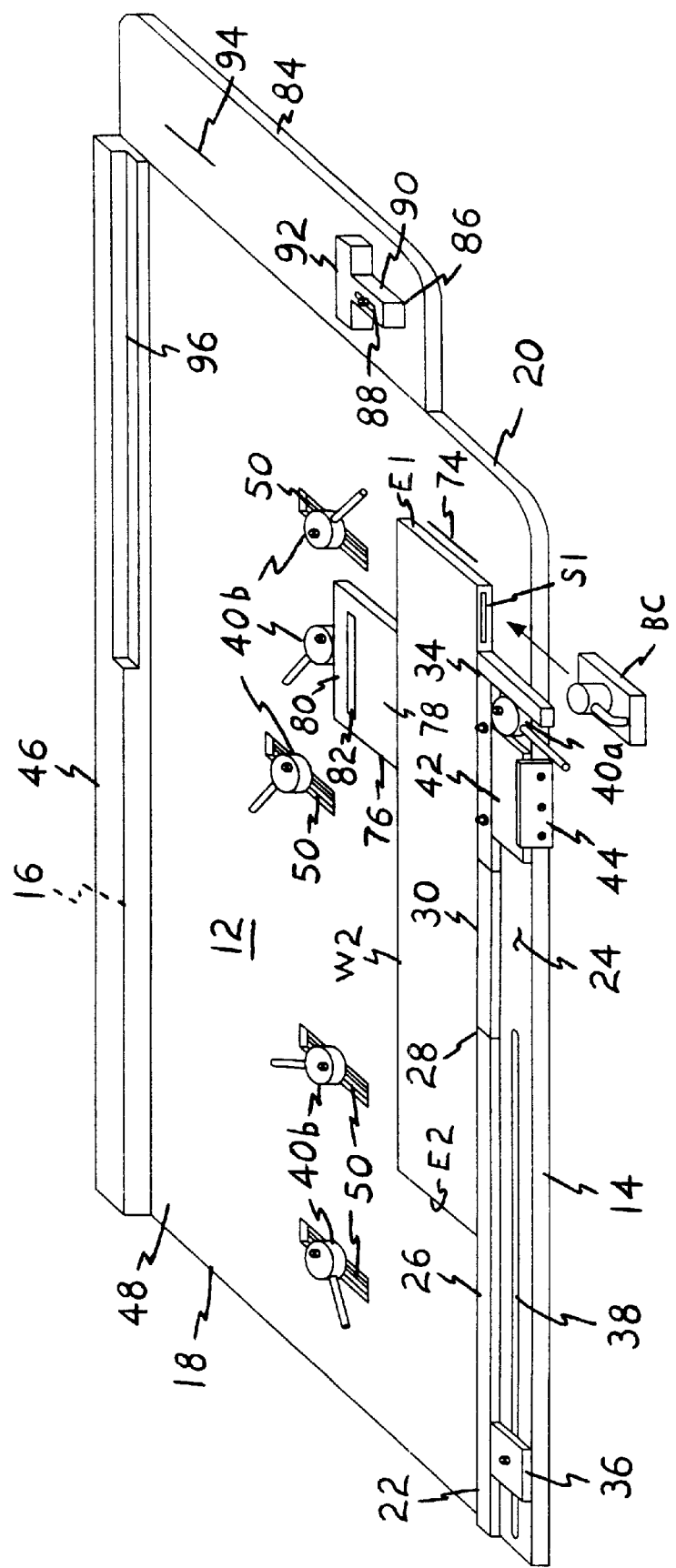
FIG. 3 is a perspective view of the table of FIG. 1, showing the clamping of a cabinet frame member thereto for forming a biscuit cut in the side of one end of the frame member.

FIG. 3 illustrates the procedure for using the present framing table 10 for forming a biscuit cut in the side of a workpiece W2 (which may be the same workpiece W1 in which the routed groove G1 was formed as shown in FIG. 2). A convenient adjustably positionable clamping cam 40b of the second workpiece support area 48 is loosened, for positioning as desired. The ninety degree guide 34 is installed on the table 12, to form one end of the first fence 22 and to serve as a guide for the biscuit cutting operation. The workpiece W2 is placed atop the second workpiece support area 48, with the elongate working edge resting against the first fence 22. The first end E1 is aligned with a guide mark 74 at a predetermined location on the table surface 12, and a pressure block 76 is placed between the selected cam 40b and the workpiece W2. The cam 40b is locked in position and tightened, securing the workpiece W2 against the first fence 22.

At this point, the biscuit cut may be formed, using a conventional "biscuit cutter" type power tool, indicated generally by the tool BC in FIGS. 3, 4, 5, and 7. The biscuit cutter tool BC is placed with one side in sliding contact with the ninety degree fence side of the fence section 34, and advanced to cut a first biscuit slot S1 in the working side of the workpiece W2. The workpiece W2 is released from the table 12 by loosening the clamps described above, and the workpiece W2 is repositioned for forming a second biscuit slot S2 in the working side of the workpiece, adjacent the second end E2.

It is not necessary to invert or turn the workpiece W2 to form the opposite second biscuit slot S2, using the present framing table 10. Rather, the workpiece W2 is merely slid along the surface of the table, to position the second end E2 of the workpiece W2 appropriately for forming the second biscuit slot S2. In this manner, all of the slots S1 and S2 are referenced from the same surface of the workpiece, which is not the case when the workpiece is inverted to reposition it for further cuts. This can save substantial time in assembly of the frame or structure, as a slight error in centering the biscuit cuts in the thickness of the material, results in the error being doubled when the pieces are assembled (e. g., 1/32 inch error in each direction, results in 1/16 inch difference between the cuts). As all biscuit cuts are referenced from the same side of the workpiece, this problem cannot occur using the present framing table 10, thus eliminating need for additional sanding, shimming, etc. of the workpiece.

The workpiece W2 is repositioned for forming the second biscuit slot S2 by sliding the workpiece W2 toward the second end 20 of the table 12, and aligning the second end E2 with a second alignment mark (not shown). Before locking the workpiece W2 in place against the first fence 22 with a suitably positioned cam clamp 40b and pressure block 76, the medial portion 30 of the first fence 30 is removed. In this manner, the working face of the workpiece W2 is accessible from the first side 14 and first workpiece support surface 24 of the table 12, allowing the biscuit cutter BC to be placed on the first workpiece surface 24 for cutting the second biscuit slot S2. This procedure is shown generally in FIG. 4 of the drawings.

At this point, a brief description of the pressure blocks 76 used in securing the various workpieces in place on the table 12, is appropriate. These pressure blocks 76 are disclosed in detail in U.S. Pat. No. 5,816,300 issued on Oct. 6, 1998 to the present inventor, which disclosure is incorporated herein by reference. Briefly, the pressure blocks 76 comprise a relatively wide and rigid workpiece contact portion 78, separated from a relatively narrower resilient cam contact portion 80 by a gap 82. The pressure blocks 76 are placed between the cam disc 40b and the workpiece, with the relatively localized pressure of the cam disc bearing against the resilient strip 80. Pressure is transferred to the wider rigid workpiece contact block 78, whereby the clamping pressure is distributed evenly over the surface of the workpiece to preclude localized pressure damage thereto.

Another feature of the pressure blocks 76 and clamping block 36 is a provision for locking or gripping points extending therefrom, which points (not shown in the drawings of the present disclosure) engage the workpiece to preclude slippage thereof relative to the blocks 36 and 76. These gripping points are also disclosed in the present inventor's previously issued '300 U.S. Patent noted above, with incorporation herein by reference hereby being made.

Figure 5:
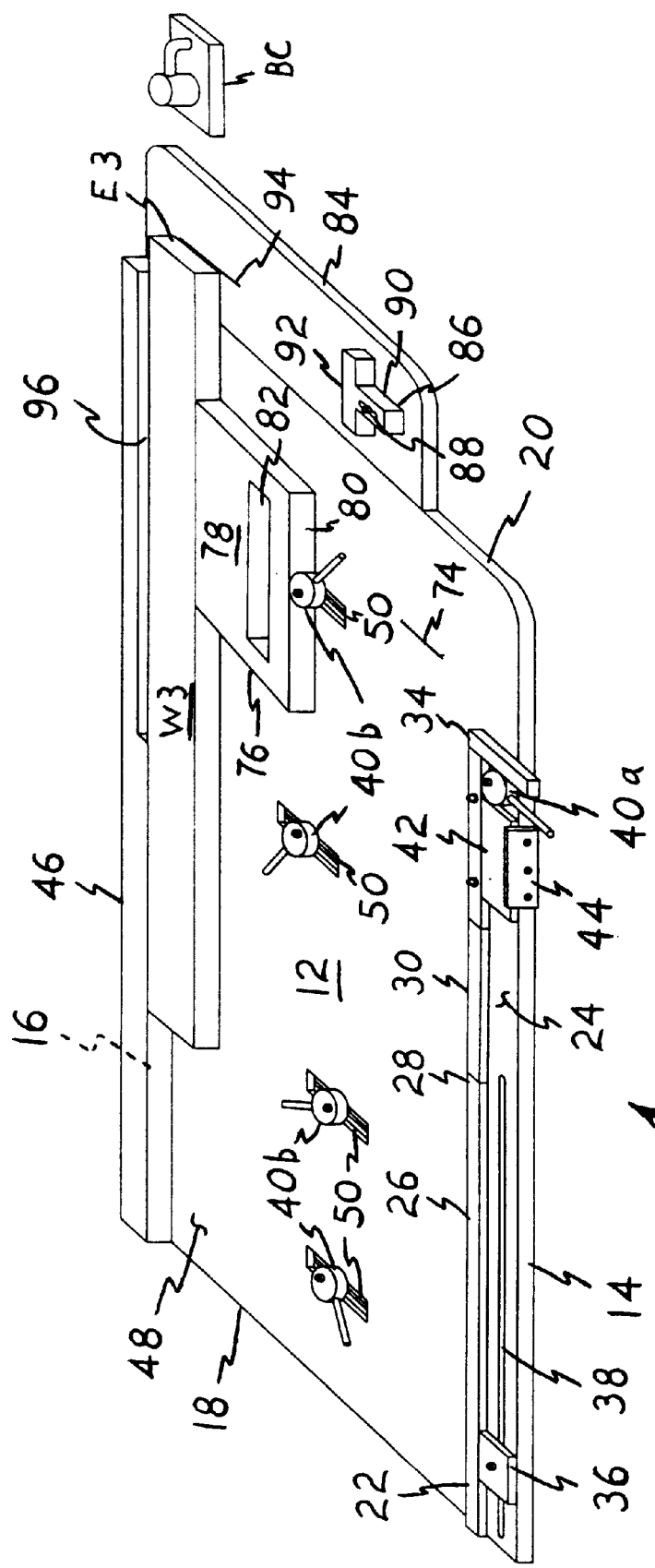
FIG. 5 is a perspective view of the table of FIG. 1, showing the clamping of a cabinet frame member thereto for forming a biscuit cut in one end of the frame member.

The present framing table 10 also includes a tool guide extension 84, which extends from the second end 20 of the table board 12. This tool guide extension 84 serves as a platform for placement of tools thereon for working the ends of materials as shown in FIG. 5, and for supporting an adjustably positionable tool guide 86. The tool guide 86 comprises a generally T-shaped structure, with an elongate slot 88 formed through the stem portion 90 of the device. A tool guide locking bolt, similar to the conventional fixed bolt used for securing the cam clamp 40a in position on the first workpiece support area 24, extends upwardly through the tool guide extension 84, with the tool guide 86 being adjustably installed on the bolt using a conventional nut for locking the assembly in place. Loosening the nut permits the tool guide 86 to be adjusted along the length of the stem slot 88, to position the crossmember 92 as desired to act as a guide or fence for guiding a tool therealong for operations as desired.

Figure 4:
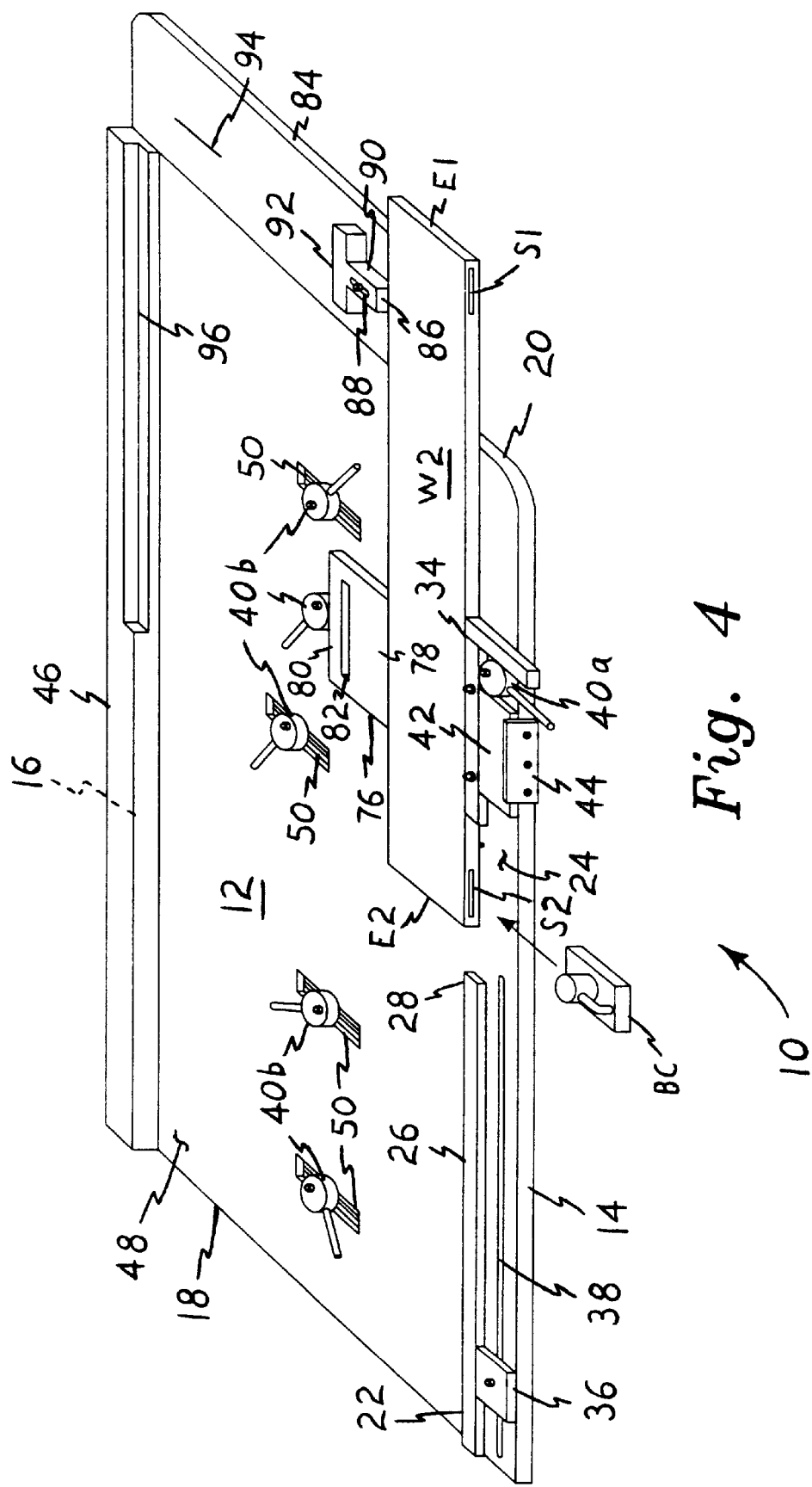
FIG. 4 is a perspective view of the table of FIG. 1, showing the repositioning of the frame member of FIG. 3 for forming a biscuit cut in the side of the opposite end of the member.

FIG. 5 illustrates the means provided by the present framing table 10 for forming a biscuit cut in the end of a workpiece, rather than along a side edge, as shown in FIGS. 3 and 4. In FIG. 5, a third workpiece W3 is positioned adjacent the second fence 46 atop the second workpiece support surface 48, with its working end E3 aligned with a second alignment mark 94 located on the tool guide extension 84. The workpiece W3 is locked in place by a pressure block 76 clamped between the workpiece W3 and a suitably located cam clamp 40b. The working end E3 of the workpiece W3 is accessible across the tool guide extension 84 of the table 12, permitting a biscuit cutting tool BC to access the end E3 of the workpiece W3 for forming a biscuit cut or slot therein. The biscuit cutter BC may be guided by means of the tool guide 86, assuming the guide 86 is properly positioned on the tool guide extension 84 (relatively wide separation is shown, for clarity in the drawing Figures).

The workpiece W3 is then released and turned around with the same face oriented upwardly for making the biscuit cut in the opposite end, in order to maintain the same distance between the biscuit cut or slot and each respective face of the workpiece W3. This is desirable as explained further above in the discussion of forming biscuit slots in the sides of the workpiece W2 as illustrated in FIGS. 3 and 4 of the drawings, in order to avoid depth misalignment of the two biscuit slots formed in each end of the workpiece.

Figure 6:
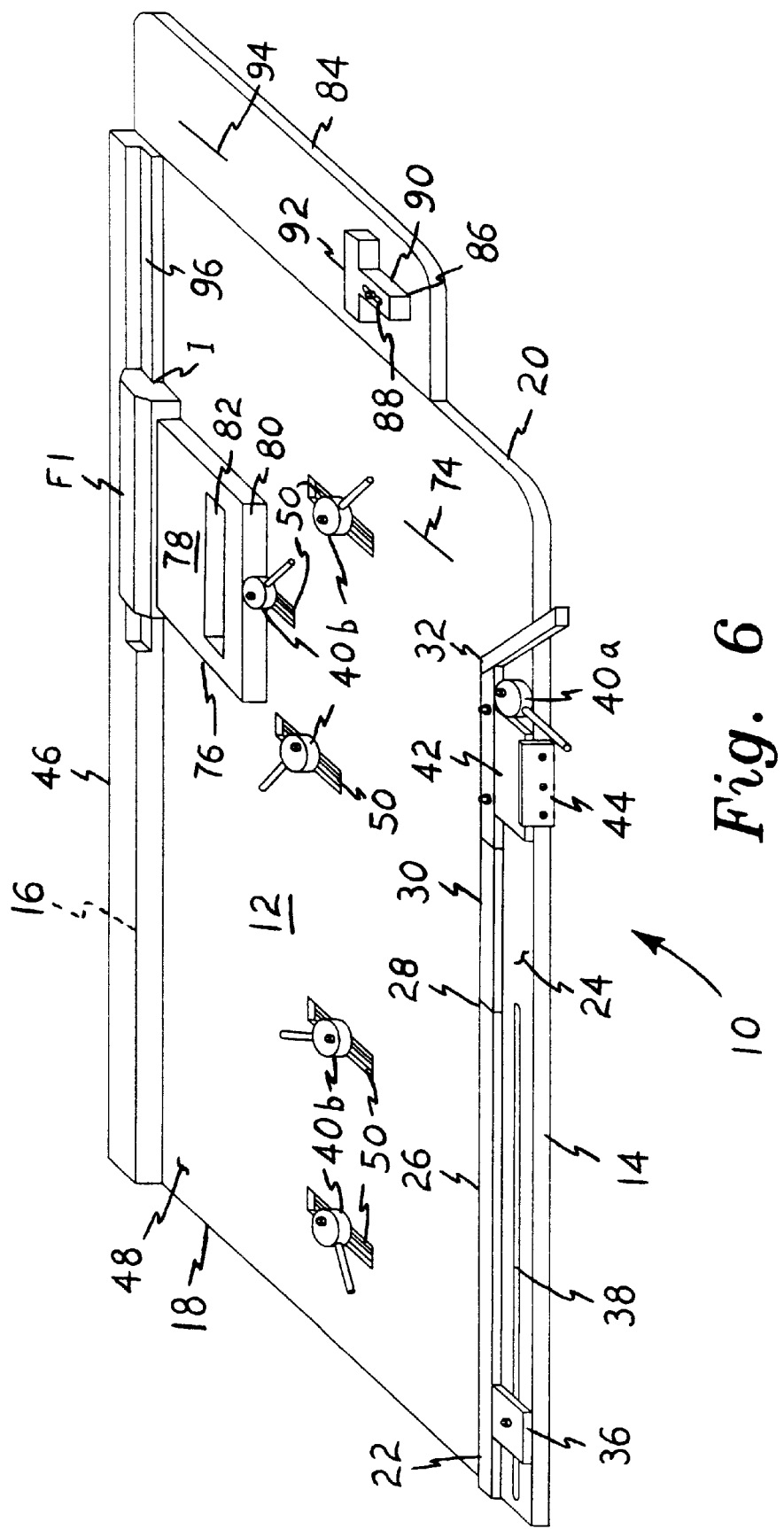
FIG. 6 is a perspective view of the table of FIG. 1, showing the clamping of a smaller frame member thereto for routing.
Figure 7:
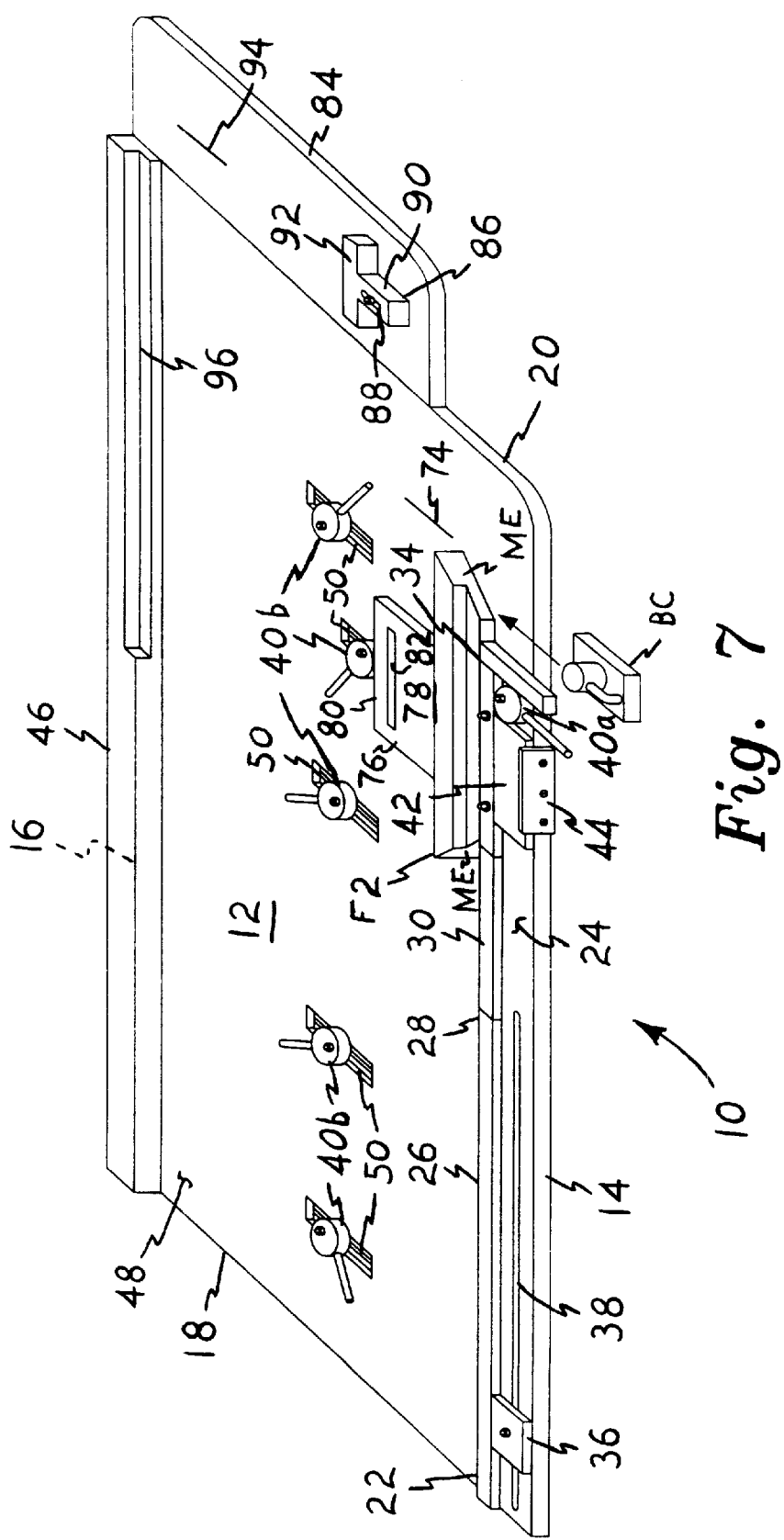
FIG. 7 is a perspective view of the table of FIG. 1, showing the clamping of a smaller frame member thereto for forming a biscuit cut in one end of the frame member.

FIGS. 6 and 7 illustrate the use of the present framing table 10 for working smaller framing members, such as picture frame and bulletin board frame members. A conventional picture frame or bulletin board frame member, such as frame member F1 of FIG. 6, includes an inset inward and rearward edge I, for seating a picture, cover glass, backing board, etc., therein. Accordingly, the second fence 46 of the present framing table 10 includes a relief area 96 formed therealong, providing a mating fence area for securely seating the inset edge I of the frame member F1 therewith. The frame member F1 is temporarily clamped along the relief portion 96 of the second fence 46, using a suitably placed clamping cam 40b and pressure block 76, as shown in FIG. 6. The frame member F1 may then be worked as desired (forming beveled edges, etc.).

In FIG. 7, a second frame member F2 having beveled or mitered ends ME, is shown clamped in position between the installed ninety degree guide fence portion 34 and a pressure block 76 and suitably positioned clamping cam 40b. The frame member F2 is aligned to allow the ninety degree arm of the guide 34 to be used to guide the biscuit cutter BC, for forming a biscuit cut in the exposed mitered end ME of the frame member F2. The application of the biscuit cutter normal to the axis of the frame member F2 for forming biscuit cuts in the mitered ends ME thereof is appropriate, as the two biscuit cuts will accept a semicircular biscuit or tongue installed therein to avoid impinging upon the picture display area, or the biscuit may be placed behind the picture display area, depending upon the depth of the cut.

Figure 9:
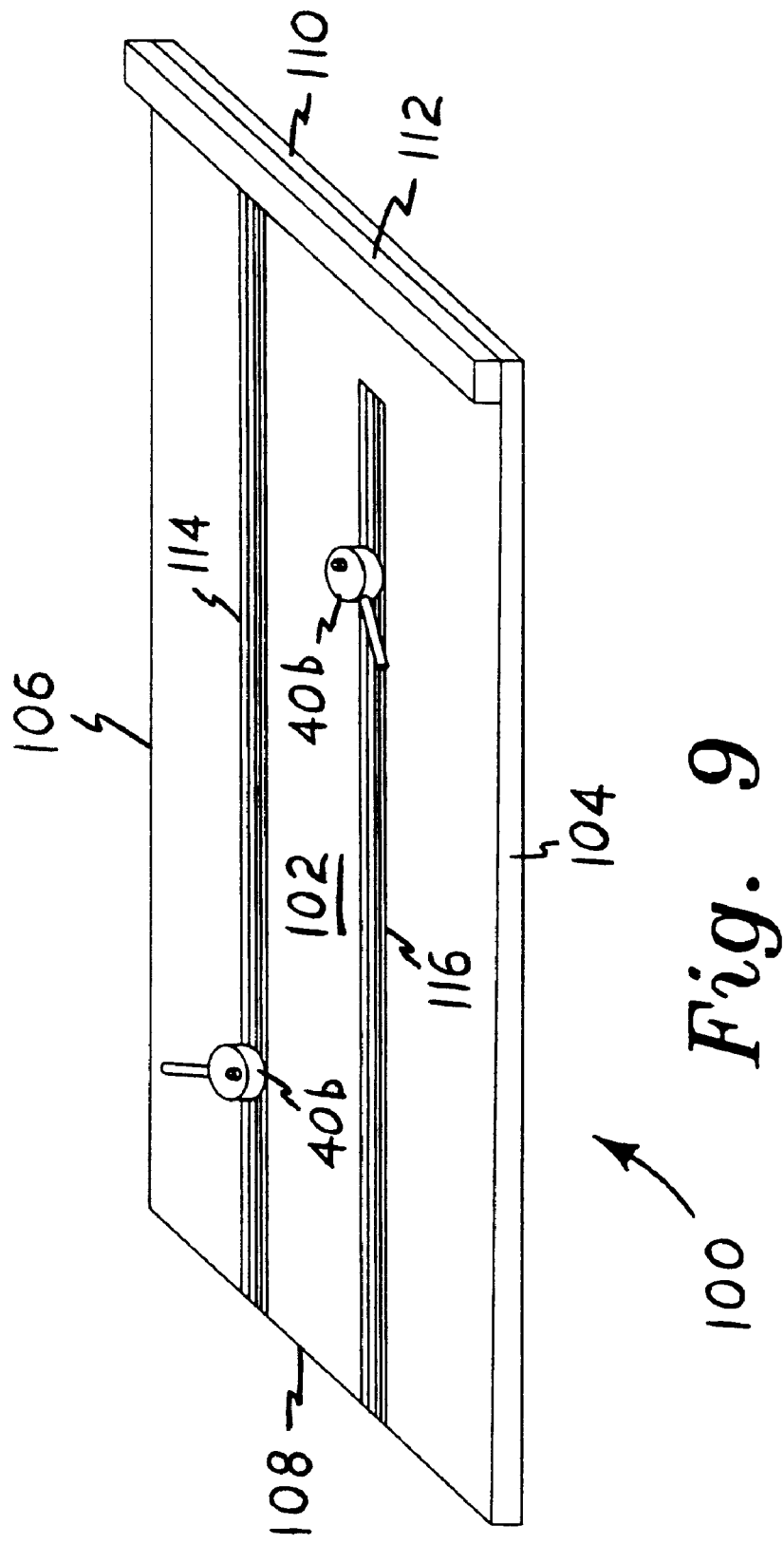
FIG. 9 is a perspective view of the paneling table of the present cabinetmaking system, showing its various components.
Figure 10:
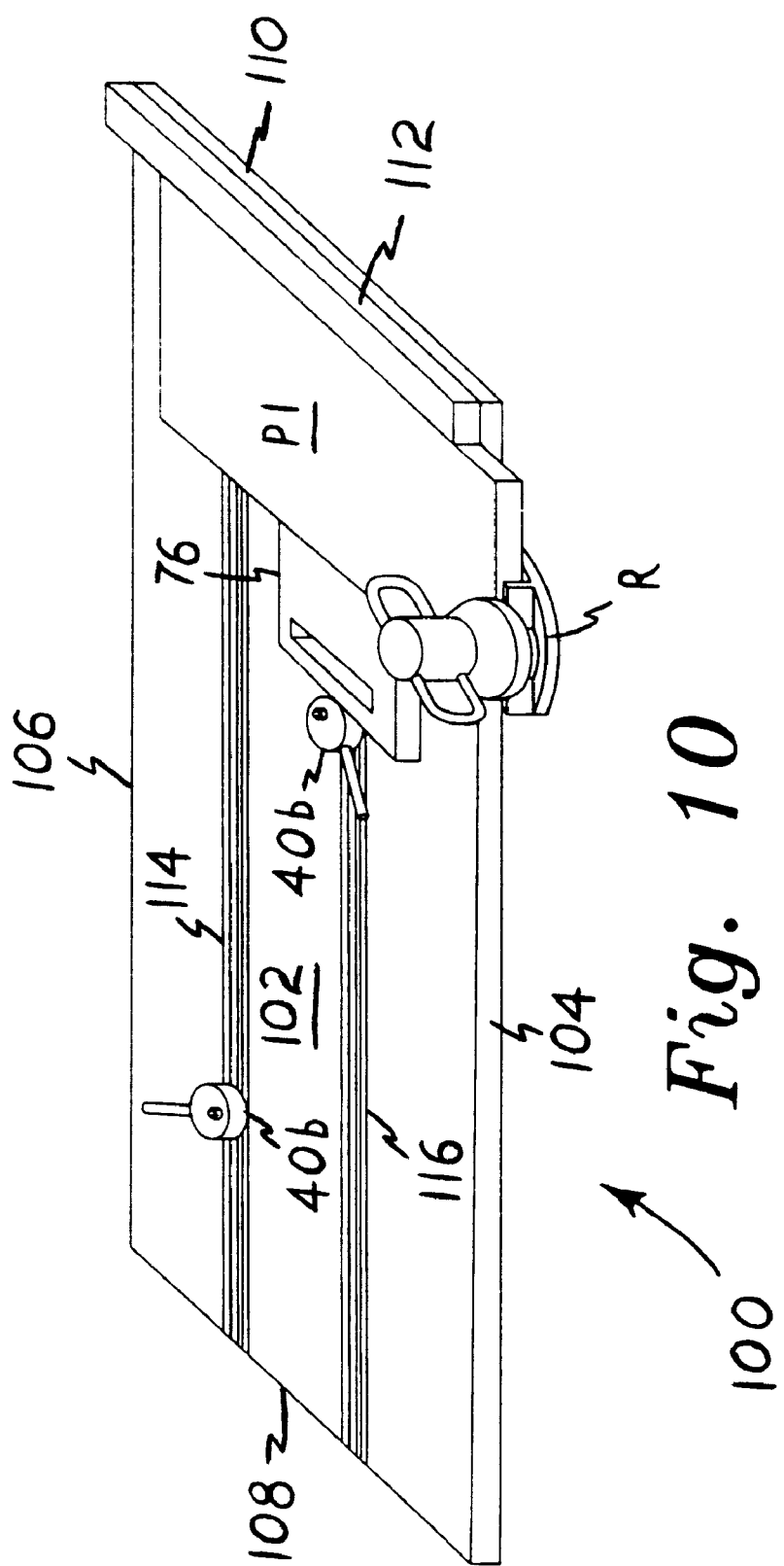
FIG. 10 is a perspective view of the table of FIG. 8, showing a workpiece clamped thereto for routing an edge of the workpiece.
Figure 11:
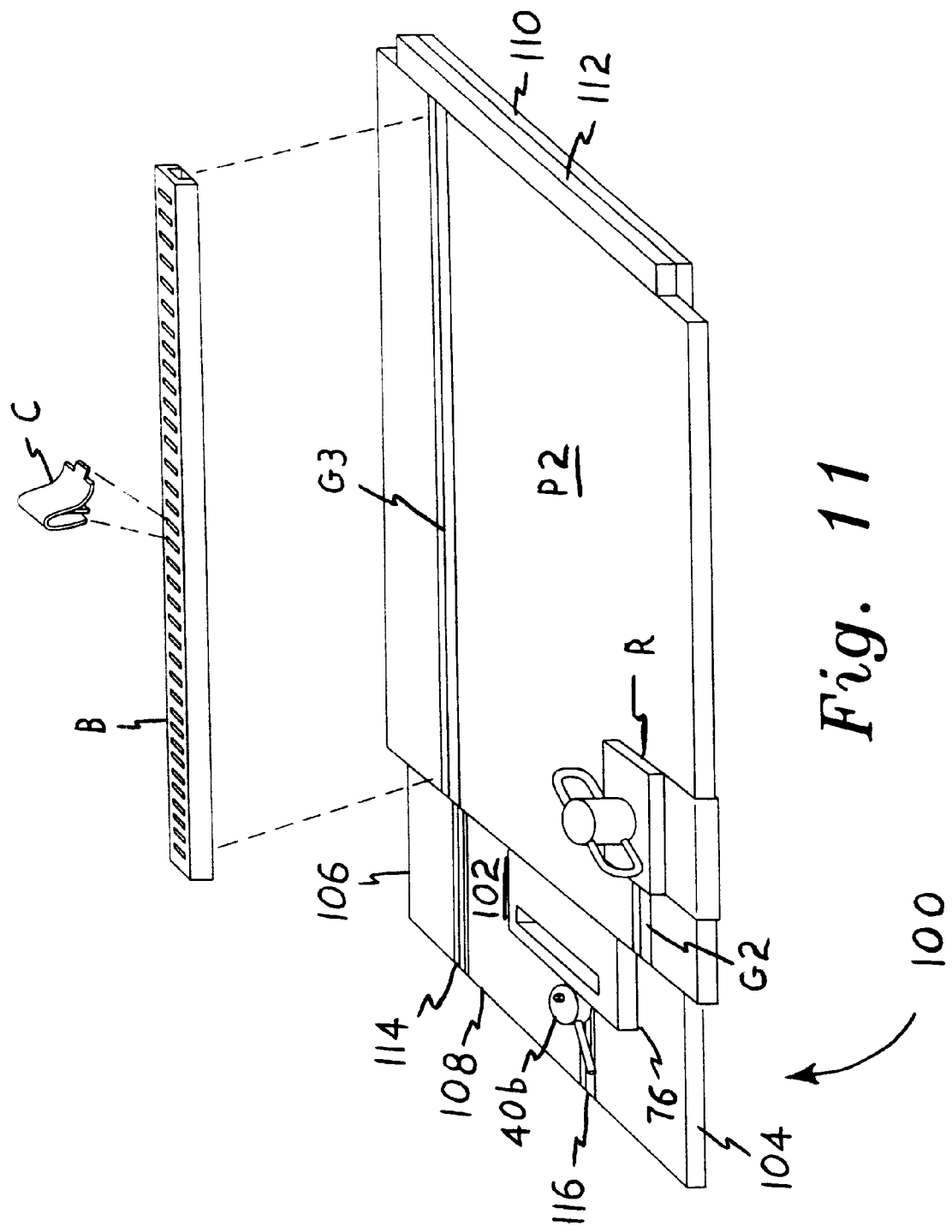
FIG. 11 is a perspective view of the table of FIG. 8, showing a workpiece clamped thereto for routing the surface of the workpiece.

FIGS. 9 through 11 illustrate a paneling table 100, for use with the framing table 10 for completing the manufacture of cabinet components. While the framing table 10 is used for relatively long and narrow components, as used for door frames and the like, the paneling table 100 is used to secure wider panels as used in the construction of side, back, and floor panels in cabinetmaking.

The paneling table 100 essentially comprises a relatively long and flat table or board 102 including a series of clamping cams 40b (identical to the clamps 40b of FIGS. 8A and 8B) adjustably disposed thereon for temporarily securing paneling components thereon for cutting and shaping as required. The table 100 includes parallel opposed first and second edges 104 and 106 and parallel opposed first and second ends 108 and 110, with the edges and ends 104 through 110 defining a generally rectangular shape. An end fence 112 is permanently and immovably affixed along the second end 110 of the table 100, for aligning cabinet panels and the like therealong when such panels are placed on the table 100.

The paneling table 100 includes first and second clamp adjustment tracks, respectively 114 and 116, extending from the first end 108 to a point at or near the second end fence 112. These two tracks have configurations identical to the tracks 50 shown in detail in FIGS. 8A and 8B of the drawings, and provide positional adjustment for one or more cam clamps 40b. Preferably, the first track 114 is positioned generally medially between the two edges 104 and 106, with the second track 116 positioned between the first track 114 and first edge 104.

FIG. 10 of the drawings illustrates the use of the present paneling table 100 for routing a glue cut or the like in the end of a first panel P1. The panel P1 is securely clamped against the end fence 112 by a pressure block 76 (identical to the pressure blocks 76 illustrated in FIGS. 3 through 7 and described further above) placed between the panel P1 and one of the clamping cams 40b secured in one of the two tracks, e.g., the second track 116. The panel P1 has its working end extended outwardly past the first edge 104 of the table 100, thus allowing a router R to be run along the working end of the panel P1 for routing a groove therein. The arrangement will be seen to be similar to that used in routing a groove along the working edge of a working piece W1 using the framing table 10, as shown in FIG. 2 of the drawings. The panel P1 may be cut lengthwise into two or more sections after the groove is formed, thus making a series of pregrooved frame rail members.

FIG. 11 illustrates the use of the paneling table 100 in forming routed grooves in a panel P2, with the grooves serving as mating glue slots for assembling back and side panels together, or as slots for the installation of shelf support brackets B therein. In FIG. 11, the panel P2 is again secured between the end fence 112 and a pressure block 76 by a clamping cam 40b, with the working edge of the panel P2 extending outwardly past the first edge 104 of the table 100. A conventional router R with a guide extending therefrom, is used to form shelf hanger grooves G2 and G3 in the panel P2, generally as shown in FIG. 11.

The grooves G2 and G3 are used to seat shelf hanger brackets B therein, one of which is illustrated in the exploded perspective view of FIG. 11. These brackets B provide adjustable support for a series of shelf support clips C, which may be adjustably installed therein generally as shown in FIG. 11. The provision for forming routed panel joining grooves or slots, along with provision for forming additional grooves or slots in the surface of a panel secured to the table 100, provides means for forming all required grooves and slots in such panels.

In summary, the present cabinetmaking system with its framing table and paneling table, provides nearly complete tooling for the finish forming of all of the various components used in the construction of cabinets and the like, including door frames and openings, wall panels, back panels, and floor panels. The framing table of the present invention has even further versatility, in that it also provides for making mitered ends, beveled edges, and biscuit cuts in framing members, as used in picture framing and bulletin board construction. The craftsman equipped with the two tables of the present invention, along with appropriate tools, requires only a table saw or equivalent tool for cutting the basic frame and panel components to initial size, with the present cabinetmaking system being capable of all further alignment and other work required to finish the frame members and panels. The present cabinetmaking system will thus prove to be a most valuable addition to any home or professional workshop in which cabinets and frames are constructed.

It is to be understood that the present invention is not limited to the embodiments described above, but encompasses any and all embodiments within the scope of the following claims.

I claim:

1. A cabinetmaking system, comprising:
   a framing table having a first edge, a second edge opposite said first edge, a first end, and a second end opposite said first end, the framing table further having:
      a first fence disposed inwardly from said first edge of said framing table and parallel thereto, and defining a first workpiece support surface between said first fence and said first edge;
      a second fence disposed along said second edge of said framing table, and defining a second workpiece support surface between said first fence and said second fence of said framing table;
      said first fence including a permanently and immovably installed first end portion, a removably installable medial section, and at least two interchangeably installable second end sections;
      a tool guide extension extending from said second end of said framing table;
      an adjustably positionable tool guide disposed upon said tool guide extension;
      a plurality of laterally disposed clamp adjustment tracks disposed upon said framing table; and
      a selectively positionable clamping cam removably disposed along each of said clamp adjustment tracks of said framing table, for temporarily securing workpieces to said framing table for cabinetry and framing work thereon; and
   a paneling table having a first edge, a second edge opposite said first edge, a first end, and a second end opposite said first end, the paneling table further having:
      an end fence permanently and immovably disposed along said second end of said paneling table;
      a first clamp adjustment track, generally medially disposed upon said paneling table and extending from said first end to said end fence of said paneling table;
      a second clamp adjustment track, disposed between and parallel to said first clamp adjustment track and said first edge of said paneling table; and
      at least one selectively positionable clamping cam removably disposed along each said clamp adjustment track of said paneling table, for temporarily securing workpieces to said paneling table for cabinetry work thereon.

2. The cabinetmaking system according to claim 1, further including:
   a clamping block adjustment track disposed along said first workpiece support surface of said framing table, and parallel to said first fence and said first edge of said framing table;
   a clamping block adjustably disposed along said clamping block adjustment track; and
   a clamping cam of said first workpiece support surface disposed adjacent to said second end sections of said framing table, for removably securing a workpiece along said first workpiece support surface for routing work thereon.

3. The cabinetmaking system according to claim 2, further including:
   a slider block disposed between said clamping block and said clamping cam of said first workpiece support surface of said framing table;
   said slider block having a workpiece contact end facing said clamping block, and a clamping cam contact end for bearing against said clamping cam of said first workpiece support surface of said framing table; and
   a guide fence disposed along said first edge of said framing table, for holding said slider block slidably between an installed one of said second end sections and said first edge of said framing table.

4. The cabinetmaking system according to claim 1, wherein each of the laterally disposed clamp adjustment tracks of said framing table and each of the first and second clamp adjustment tracks of said panelling table has a length and further comprises:
   recessed top and bottom channels extending for the length of the track;
   a slot extending between corresponding said top and bottom channels;
   a retaining block slidably disposed in each of said bottom channels;

an alignment pin and a locking bolt extending upwardly from each said retaining block, and slidably engaging a corresponding said slot of a corresponding one of the tracks;

a retaining block locking nut disposed generally medially along each said locking bolt, for selectively locking said retaining block in position as desired along a corresponding one of the tracks; and a clamp locking nut removably disposed atop each said locking bolt, for selectively securing and locking in place a corresponding said clamping cam as desired.

5. The cabinetmaking system according to claim 1, wherein each said clamping cam of said framing table and each said clamping cam of said paneling table further comprises:

a generally circular disc having a circumference with a contact face;

a leverage handle extending generally radially from said disc, opposite said contact face;

said disc further including an axially offset pivot hole formed therethrough, for passing over a corresponding said locking bolt of a corresponding said retaining block; whereby rotation of said disc about said locking bolt by said leverage handle urges said contact face of said disc toward the workpiece for applying clamping pressure thereto.

6. The cabinetmaking system according to claim 1, further including:

at least one pressure block;

said pressure block including a rigid workpiece contact portion and a resilient cam contact portion, for distributing localized pressure upon said cam contact portion evenly across said workpiece contact portion for applying even pressure to the workpiece over a wide area when said pressure block is placed between a corresponding said clamping cam and the workpiece.

7. The cabinetmaking system according to claim 1, wherein said at least two second end sections of said first fence of said framing table further include at least a ninety degree angle guide and a forty five degree angle guide.

8. The cabinetmaking system according to claim 1, wherein:

said tool guide extension of said framing table further comprises a tool guide locking bolt immovably affixed therethrough and extending upwardly therefrom; and said tool guide further comprises:

a generally T-shaped block having a stem and a crossmember, the stem having a longitudinal adjustment slot formed therethrough for passing over said tool guide locking bolt; and a tool guide locking nut for securing to said tool guide locking bolt atop said tool guide, for selectively locking said tool guide in place upon said tool guide extension of said framing table.

9. A cabinetmaking system, comprising:

a framing table having a first edge, a second edge opposite said first edge, a first end, and a second end opposite said first end;

a first fence disposed inwardly from said first edge of said framing table and parallel thereto, and defining a first workpiece support surface between said first fence and said first edge;

a second fence disposed along said second edge of said framing table, and defining a second workpiece support surface between said first fence and said second fence of said framing table;

said first fence including a permanently and immovably installed first end section, a removably installable medial section, and at least two interchangeably installable second end sections;

a tool guide extension extending from said second end of said framing table;

an adjustably positionable tool guide disposed upon said tool guide extension;

a plurality of laterally disposed clamp adjustment tracks disposed upon said framing table; and a plurality of selectively positionable clamping cams removably disposed along each of said clamp adjustment tracks of said framing table, for temporarily securing workpieces to said framing table for cabinetry and framing work thereon.

10. The cabinetmaking system according to claim 9, further including:

a clamping block adjustment track disposed along said first workpiece support surface of said framing table, and parallel to said first fence and said first edge of said framing table;

a clamping block adjustably disposed along said clamping block adjustment track; and a clamping cam of said first workpiece support surface disposed adjacent to said second end sections of said framing table, for removably securing a workpiece along said first workpiece support surface for routing work thereon.

11. The cabinetmaking system according to claim 10, further including:

a slider block disposed between said clamping block and said clamping cam of said first workpiece support surface of said framing table;

said slider block having a workpiece contact end facing said clamping block, and a clamping cam contact end for bearing against said clamping cam of said first workpiece support surface of said framing table; and a guide fence disposed along said first edge of said framing table, for holding said slider block slidably between an installed one of said second end sections and said first edge of said framing table.

12. The cabinetmaking system according to claim 9, wherein each of said clamp adjustment tracks has a length and further comprises:

recessed top and bottom channels extending for the length of said track;

a slot extending between corresponding said top and bottom channels;

a retaining block slidably disposed in each of said bottom channels;

an alignment pin and a locking bolt extending upwardly from each said retaining block, and slidably engaging a corresponding said slot of a corresponding one of said tracks;

a retaining block locking nut disposed generally medially along each said locking bolt, for selectively locking said retaining block in position as desired along a corresponding one of said tracks; and a clamp locking nut removably disposed atop each said locking bolt, for selectively securing and locking in place a corresponding said clamping cam as desired.

13. The cabinetmaking system according to claim 9, wherein each said clamping cam further comprises:

a generally circular disc having a circumference with a contact face;

a leverage handle extending generally radially from said disc, opposite said contact face;

said disc further including an axially offset pivot hole formed therethrough, for passing over a corresponding said locking bolt of a corresponding said retaining block; whereby rotation of said disc about said locking bolt by said leverage handle urges said contact face of said disc toward the workpiece for applying clamping pressure thereto.

14. The cabinetmaking system according to claim 9, further including:

at least one pressure block;

said pressure block including a rigid workpiece contact portion and a resilient cam contact portion, for distributing localized pressure upon said cam contact portion evenly across said workpiece contact portion for applying even pressure to the workpiece over a wide area when said pressure block is placed between a corresponding said clamping cam and the workpiece.

15. The cabinetmaking system according to claim 9, wherein said at least two second end sections of said first fence of said framing table further include at least a ninety degree angle guide and a forty five degree angle guide.

16. The cabinetmaking system according to claim 9, wherein:

said tool guide extension of said framing table further comprises a tool guide locking bolt immovably affixed therethrough and extending upwardly therefrom; and said tool guide further comprises:

a generally T-shaped block having a stem and a crossmember, the stem having a longitudinal adjustment slot formed therethrough for passing over said tool guide locking bolt; and a tool guide locking nut for securing to said tool guide locking bolt atop said tool guide, for selectively locking said tool guide in place upon said tool guide extension of said framing table.

\* \* \* \* \*